United States Patent [19]

Simon

[11] 4,306,858
[45] Dec. 22, 1981

[54] RECUPERATIVE HEATING UNIT FOR INDUSTRIAL FURNACE

[75] Inventor: Horst Simon, Essen, Fed. Rep. of Germany

[73] Assignee: Loi Industrieofenanlagen GmbH, Essen, Fed. Rep. of Germany

[21] Appl. No.: 152,478

[22] Filed: May 22, 1980

[30] Foreign Application Priority Data

May 23, 1979 [DE] Fed. Rep. of Germany ....... 2920902

[51] Int. Cl.³ .............................................. F27B 5/14
[52] U.S. Cl. ................................. 432/209; 126/91 A; 431/215
[58] Field of Search ........................ 432/209; 431/215; 126/91 A

[56] References Cited

U.S. PATENT DOCUMENTS

| 3,163,202 | 12/1964 | Schmidt et al. | 431/215 |
| 3,920,383 | 11/1975 | Kerr | 126/91 A |
| 4,038,022 | 7/1977 | Blackman | 431/215 |
| 4,140,482 | 2/1979 | Simon | 432/209 |

FOREIGN PATENT DOCUMENTS 537657  7/1941  United Kingdom ............ 126/91 R

OTHER PUBLICATIONS

Pages 153 and 388 from Becher Handbuch der Gasanwendung (Handbook of Gas Use), VEB Verlag Technik Berlin, 1953.

*Primary Examiner*—John J. Camby
*Attorney, Agent, or Firm*—Karl F. Ross

[57] ABSTRACT

A burner housing lodged in a furnace wall comprises a nest of coaxial tubes including an inner gas-supply tube terminating in a burner head, an intermediate air-supply tube extending past that head to form a combustion chamber, and an outer tube defining with the intermediate tube a return duct for combustion gases. The metallic intermediate tube is provided with thermally conductive vanes facilitating the preheating of the entering combustion air by the high-temperature exhaust gases whose residual heat is then utilized to preheat the incoming fuel gas in a heat exchanger laterally connected with the outer tube. An ancillary burner at the opposite end of the inner tube directs a pilot flame toward the burner head.

6 Claims, 1 Drawing Figure

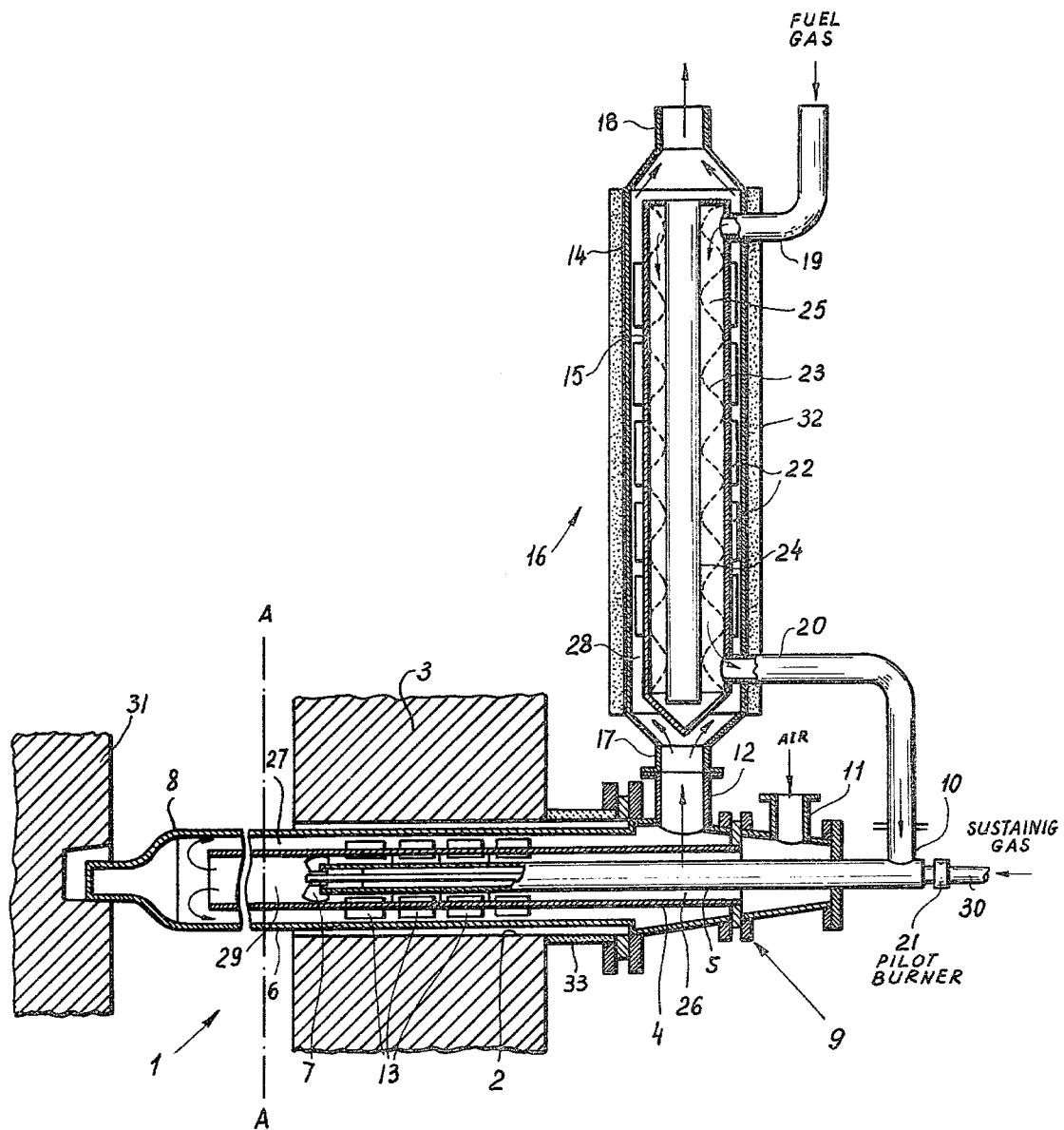

RECUPERATIVE HEATING UNIT FOR INDUSTRIAL FURNACE

FIELD OF THE INVENTION

My present invention relates to a recuperative heating unit for the firing of an industrial furnace.

BACKGROUND OF THE INVENTION

A heating unit of this general type has been disclosed in my prior U.S. Pat. No. 4,140,482. Such a unit has a burner housing receivable in a wall of the furnace to be heated thereby, the burner housing comprising three coaxial tubes; the innermost and the intermediate tubes respectively supply a fuel gas and air to a combustion space while exhaust gases from that space flow in the opposite direction through the outermost tube. In that prior system, the incoming combustion air is preheated mainly in a collateral heat exchanger which it traverses in counterflow to the exhaust gases.

Such a heating unit operates satisfactorily with highly calorific fuel gases but is less effective with lean gases whose calorific value lies in a range of about 3 to 7 $MJ/m^3$.

OBJECT OF THE INVENTION

The object of my present invention, therefore, is to provide an improved recuperative heating unit for the efficient utilization of such less calorific fuel gases.

SUMMARY OF THE INVENTION

In accordance with my present invention, the innermost tube of the burner housing terminating in a burner head within that housing communicates at its opposite or rear end with a fuel-gas conduit which is partly formed by an inner jacket of a collateral heat exchanger whose outer jacket is traversed by the exhaust gases exiting, as in the prior system, through a discharge duct formed between the intermediate and the outermost tube of the housing. The exhaust gases, after first preheating a flow of incoming atmospheric combustion air passing through an air-supply duct formed between the inner and intermediate tubes, have enough residual heat left for an effective preheating of the incoming fuel gas whose volume generally is substantially smaller than that of the combustion air. I have found that, with such preheating, even a relatively lean gas within the aforementioned calorific range will be suitable to fire an industrial furnace, either indirectly through an end wall of the burner housing or directly with a flame entering the interior of the furnace from the open-ended housing. If desired, the rear end of the inner tube remote from the burner head may be provided with an axial inlet for a sustaining gas fed to a pilot burner in that tube.

Since the collateral heat exchanger now used to preheat the fuel gas is no longer available for preheating the combustion air, I prefer to provide the burner housing with heat-conducting formations traversing the intermediate tube to promote the heat exchange between the entering air flow and the exiting exhaust gases in the region immediately upstream of the burner head.

BRIEF DESCRIPTION OF THE DRAWING

The above and other features of my invention will now be described in detail with reference to the accompanying drawing the sole FIGURE of which shows, in sectional elevation, a recuperative heating unit constituting a preferred embodiment.

SPECIFIC DESCRIPTION

As shown in the drawing, a heating unit 1 has a burner housing received in a bore 2 of a wall 3 of an industrial furnace to be heated thereby. The burner housing consists of three horizontal coaxial tubes, namely an inner tube 5, an intermediate tube 4 and an outer tube 6. Inner tube 5 terminates in a burner head 7 at the entrance of a combustion chamber 29 formed by a front end of intermediate tube 4 extending past that burner head. Tubes 4 and 5 define an annular air-supply duct 26 which is open toward the atmosphere at an inlet port 11 communicating with a rear extremity of tube 4. A discharge duct 27 for exhaust gases developing in combustion chamber 29 is formed by tubes 4 and 6. Intermediate tube 4, consisting of a metal of good thermal conductivity, is shown provided with a set of heat-conducting vanes 13 extending partly into the air-supply duct 26 and partly into the exhaust duct 27 to intensify the heat transfer between the exhaust gases and the incoming combustion air.

In the embodiment illustrated, the peripheral housing wall formed by outer tube 6 has a closed front end 8 through which heat from the combustion chamber 29 can be radiated toward an element 31 of the furnace serving, for example, as a workpiece support. It is, however, possible to cut off the burner at a transverse plane A—A in order to let its flame enter the interior of the furnace; this does not entail any significant change in its recuperative mode of operation.

The rear end of inner tube 5 remote from burner head 7 is provided with a lateral entrance port 10 for fuel gas which passes through a conduit formed by a supply pipe 19, an inner jacket 15 of a collateral heat exchanger 16 which is coaxially surrounded by an outer jacket 14, and an outlet pipe 20 opening into port 10. A conduit 30 carries sustaining gas to a pilot burner 21 fitted onto tube 5.

The collateral or ancillary heat exchanger 16 is similar in its structure to that of my prior patent and has a thermally insulating outer layer 32 sheathing the jacket 14 as well as heat-conducting vanes 22, also acting as sound dampers, on the outer surface of jacket 15 in an annular space 28 formed between the two jackets. A central core 24 defines with inner jacket 15 another annular space 25 provided with corrugated wire-mesh strips 23 also designed to promote heat transfer between that space, traversed by the incoming fuel gas, and the space 28 which constitutes an extension of discharge duct 27. Space 28, open toward the atmosphere at a flue 18, has a neck 17 which is flanged to a lateral port 12 on the rear end of tube 6; air inlet 11 is located between discharge port 12 and gas-inlet port 10. Ports 11 and 12 are formed by an assembly 9 of flanged extensions of tubes 4 and 6.

It will thus be seen that the heat of the exhaust gases is transferred first—at a relatively high temperature—to the larger mass of entering air and thereafter—at a lower temperature—to the smaller mass of incoming fuel gas. The most intense heat exchange between the exhaust gases and the air takes place within bore 2 where the vanes 13 are located; the exposed part of the burner housing between furnace wall 3 and rear assembly 9 is surrounded by a thermally insulating envelope 33 terminating close to the discharge port 12.

Only a small amount of sustaining gas will be needed even with lean fuel gas to maintain combustion in burner chamber 29. With richer fuels the influx of sustaining gas may be discontinued.

I claim:

1. A recuperative heating unit for the firing of an industrial furnace, comprising:

a burner assembly receivable in a furnace wall, said burner assembly including an inner tube terminating in a burner head, an intermediate tube coaxially surrounding said inner tube and forming therewith an air-supply duct, and an outer tube constituting a peripheral housing wall, said outer tube coaxially surrounding said intermediate tube and forming therewith a discharge duct for exhaust gases evolving in the vicinity of said burner head;

a recuperative heat exchanger comprising an outer jacket and an inner jacket coaxial with each other and spaced from said burner assembly, said inner jacket forming part of said fuel-gas conduit, said outer jacket defining with said inner jacket an extension of said discharge duct open toward the atmosphere; and an inlet for atmospheric combustion air communicating with said intermediate tube at an extremity thereof remote from said burner head whereby said combustion air is preheated through said intermediate tube by high-temperature exhaust gases leaving the vicinity of said burner head, said exhaust gases thereupon entering said extension to preheat incoming fuel gas in said conduit through said inner jacket before escaping into the atmosphere.

2. A heating unit as defined in claim 1 wherein said intermediate tube is provided with heat-conducting formations extending partly into said air-supply duct and partly into said discharge duct.

3. A heating unit as defined in claim 1 or 2 wherein said extension communicates with said discharge duct through a lateral port on said outer tube, said jackets having an axis substantially perpendicular to the axis of said tubes.

4. A heating unit as defined in claim 3 wherein said fuel-gas conduits has an outlet opening laterally into said remote end of said inner tube, said air inlet being disposed on an extension of said intermediate tube between said lateral port and said outlet.

5. A heating unit as defined in claim 4 wherein said inner tube is provided at said remote end with a pilot burner having an inlet for a sustaining gas.

6. A heating unit as defined in claim 1 or 2 wherein said intermediate tube extends within said outer tube beyond said burner head to form an open-ended combustion chamber.

* * * * *